(No Model.)
C. GRUNDER & J. H. MOYER.
Harness Pad.
No. 234,125.  Patented Nov. 9, 1880.
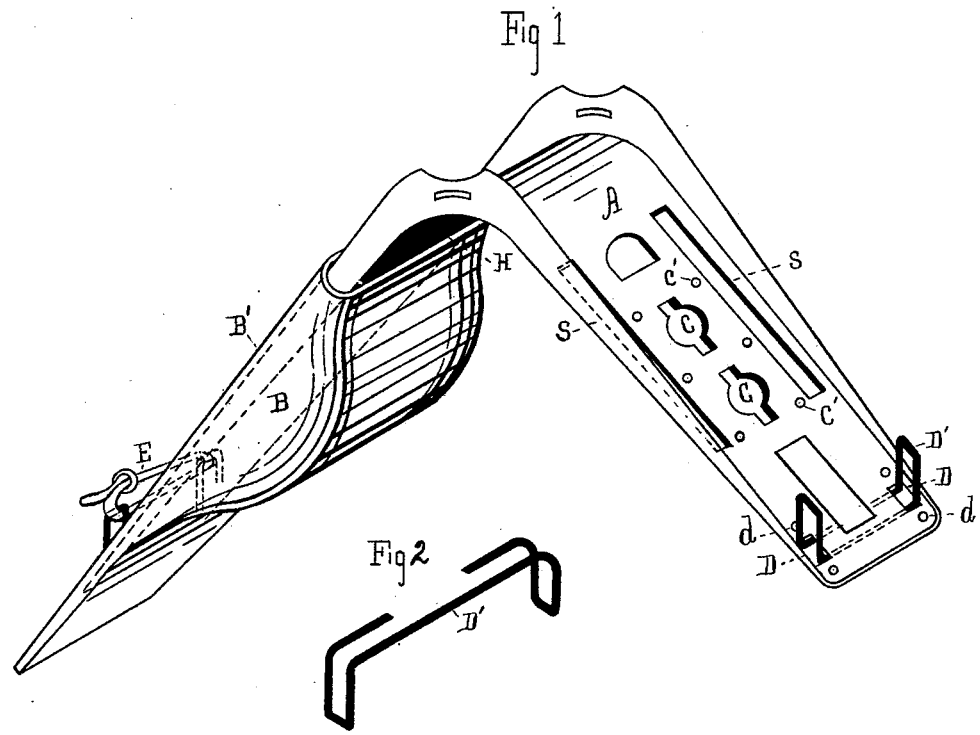
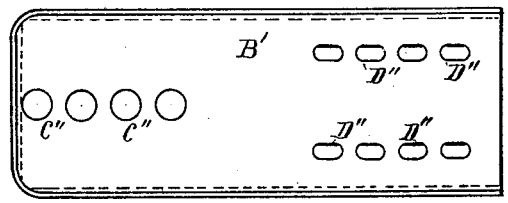
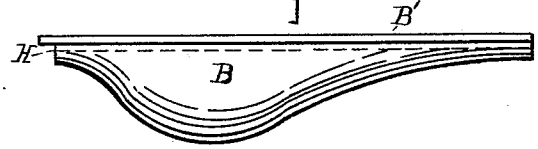
Witnesses
Frank P Kinsey
Frank Hartman
Inventors
Christian Grunder
Joseph H Moyer
Per Thomas P Kinsey Atty

UNITED STATES PATENT OFFICE.

CHRISTIAN GRUNDER AND JOSEPH H. MOYER, OF READING, PA.

HARNESS-PAD.

SPECIFICATION forming part of Letters Patent No. 234,125, dated November 9, 1880.

Application filed May 4, 1880. (No model.)

*To all whom it may concern:*

Be it known that we, CHRISTIAN GRUNDER and JOSEPH H. MOYER, both of the city of Reading, county of Berks, State of Pennsylvania, have invented a new and useful Improvement in the Construction of a Frame-Shifting Harness-Pad, of which the following is a specification.

Our invention relates to improvements in harness-tree frames, whereby, in combination with a loose pad, the tree or saddle is made adjustable to the back of the animal.

Referring to the drawings in explanation of our invention, Figure 1 is an elevation in perspective, showing one-half of the frame divested of trimmings, the opposite half being trimmed; Fig. 2, detail of wire loop to secure the saddle cover or protector; Fig. 3, plan of movable or shifting pad; Fig. 4, side elevation of shifting pad.

Similar letters in all the figures refer to similar parts.

The object of our invention is to prevent the chafing and wear of the back of an animal to which a harness-pad is applied, and to relieve animals whose backs have from the use of the ordinary pad become sore and raw, by furnishing a pad which, in connection with the frame, can be adjusted to conform to the shape of a fat or lean animal without any trouble and in a very short time.

We make the saddle tree or frame of malleable iron or of wrought-iron, preferably of the latter, with the edge turned up away from the animal's back. This prevents abrasion, and at the same time stiffens the frame. We have openings C C, in which the terret-nuts are inserted and secured in place by sewing through the holes C' C'.

At the lower ends of the frame A are two oblong slots, D D, for the reception of a wire loop, D', used for the retention of the frame-cover B'.

The loop D', of wire, is bent of the form shown, inserted in the oblong holes D D, and secured in place by wire or thread through the holes d d. We also have longitudinal holes or slots S S at the sides of the frame, for the purpose of enabling us to make the attachment of the trimming to the frame.

The pads B are of any suitable material, preferably of leather stuffed with hair, as is usual, and then backed with leather, so as to leave a space, H, between the two surfaces sufficient for the entrance of the wing of the tree or frame A.

The backing-leather B' has terret-holes C'' C'', corresponding in distance between centers with those in the frame A, and oblong slots D'' D'' at equal distances, for the reception of the wire loop D'.

Our arrangement of pad is such that, no matter whether the animal be fat or lean, when the frame and pads are adjusted to suit its back there will be an air-space left unobstructed over the spinal column. This allows air to circulate under the frame, prevents heating, and by prevention makes a sore back impossible.

Our saddle tree or frame is not confined to new sets of harness, but is used supplemental to sets already in use, being placed upon the animal's back underneath the regular harness-saddle.

To adjust the tree-frame and pads to the animal, the harness is thrown upon its back, the terrets removed from the nuts, and cover B' released from the wire loops D'. The pad B is then slid up or down, as the case may require, until one of the holes C'' in the pad-cover B' is in correspondence with hole C in the frame, when the terrets are again screwed in place, and the strap run through the wire loop D', making the adjustment complete.

Having described our invention, together with its construction and use, what we claim, and desire to secure by Letters Patent, is as follows, to wit:

1. A metal harness saddle-tree, A, having double terret-holes C C, wire loop-holes D D, longitudinal slots S S, with edges convex, in relation to the back of the animal, in combination with the shifting-pad B, for the purpose described and substantially as shown.

2. The shifting-pad B, with secondary back B', having a series of terret-holes, C'' C'', and wire loop-holes D'' D'', with the space H between the pad B and back B', in combination with the harness-tree A, substantially as shown, and for the purpose described.

3. The wire loop D', in combination with the frame A, pad B, provided with cover B' and strap E, as shown, and for the purpose described.

CHRISTIAN GRUNDER.
JOSEPH H. MOYER.

Witnesses:
J. KREMP,
D. KREMP.